Figure 1:
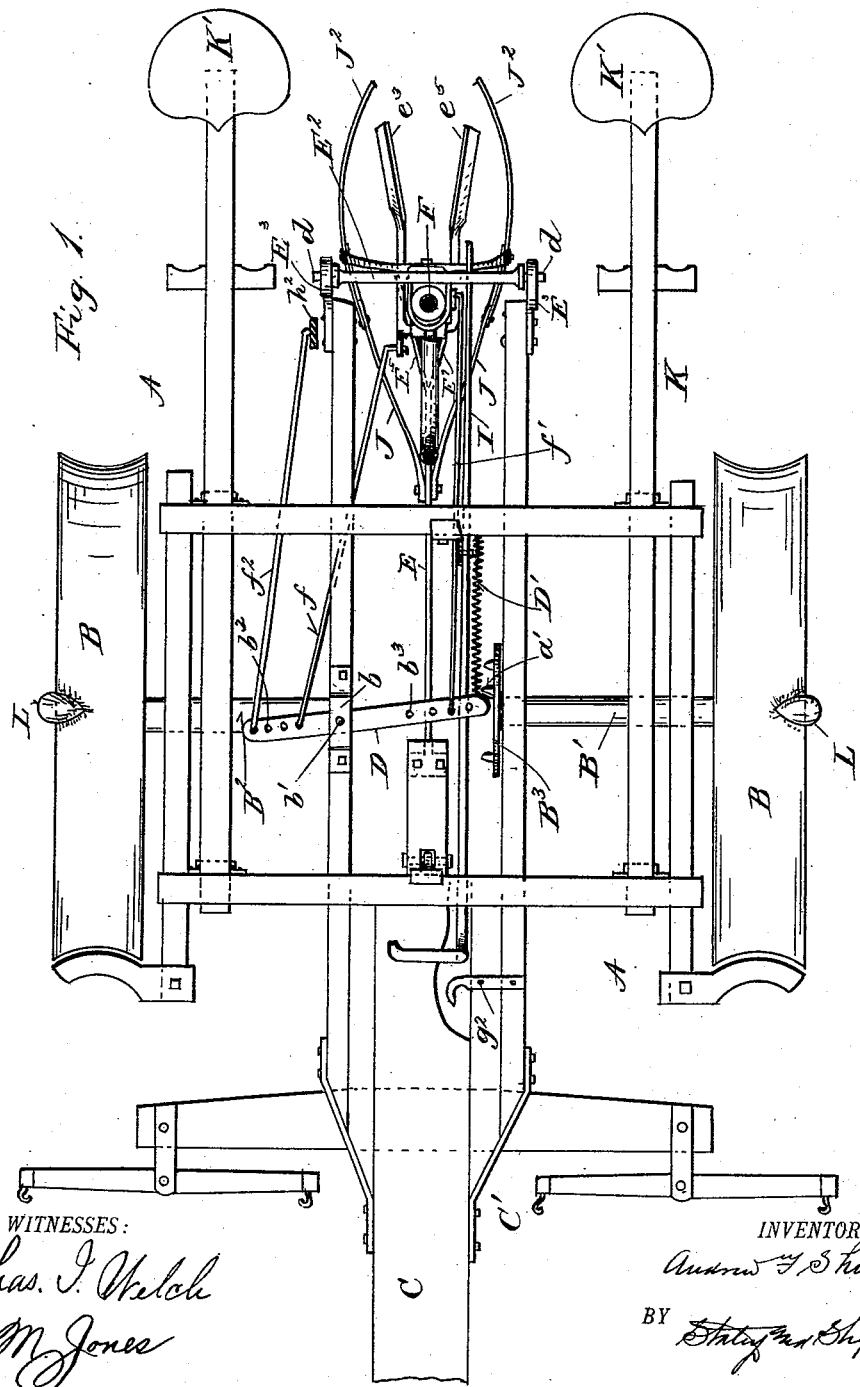

(No Model.) 3 Sheets—Sheet 1.

A. F. SHULER.
TOBACCO PLANTER.

No. 471,624. Patented Mar. 29, 1892.

WITNESSES:
Chas. I. Welch
F. M. Jones

INVENTOR
Andrew F. Shuler
BY
Staley and Shepherd
ATTORNEYS (No Model.) 3 Sheets—Sheet 2.
A. F. SHULER.
TOBACCO PLANTER.
No. 471,624. Patented Mar. 29, 1892.
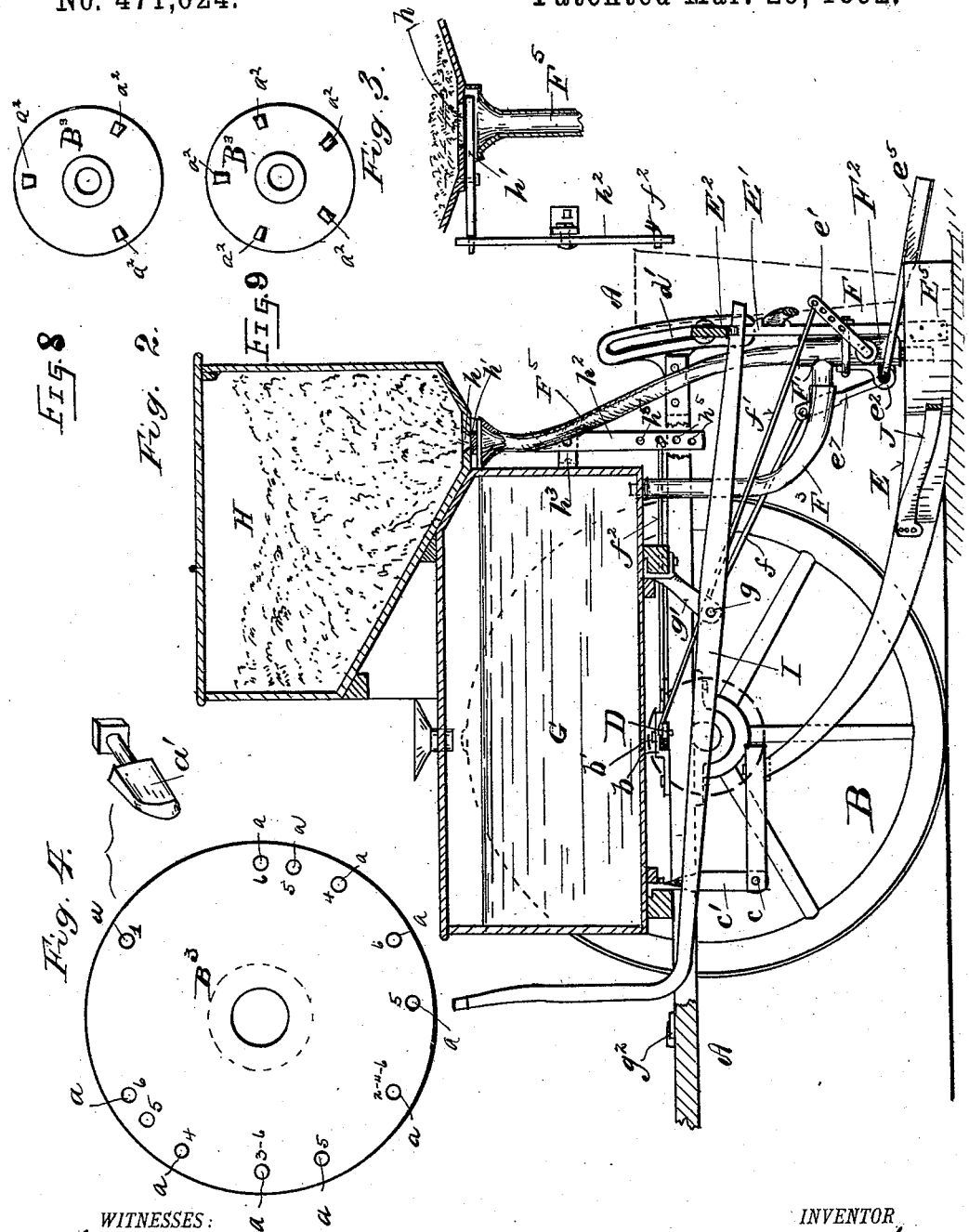
WITNESSES:
Chas. I. Welch
F. M. Jones
INVENTOR
Andrew F. Shuler
BY
Staley M. Shepherd
ATTORNEYS (No Model.) 3 Sheets—Sheet 3.
A. F. SHULER.
TOBACCO PLANTER.
No. 471,624. Patented Mar. 29, 1892.
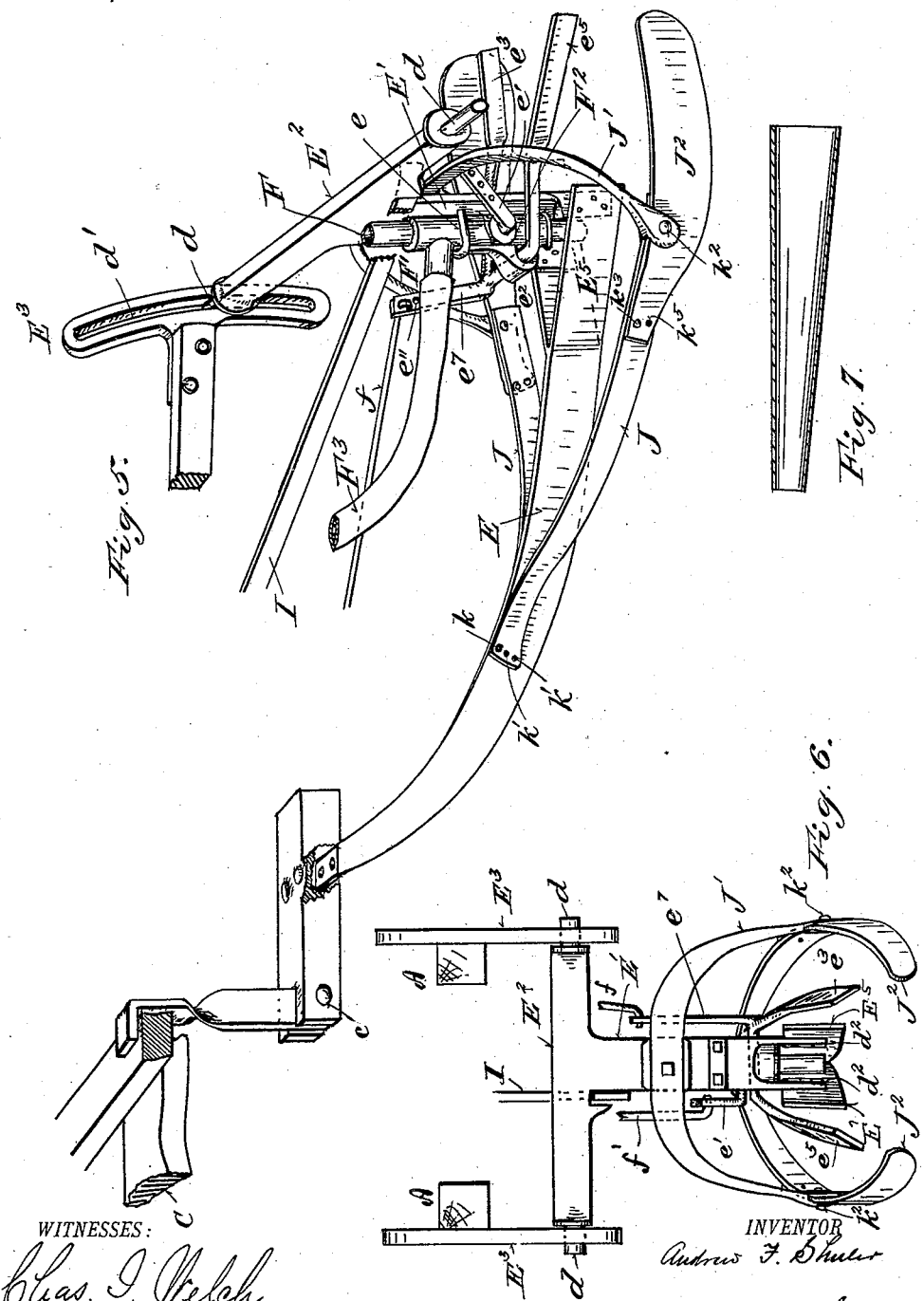
WITNESSES:
Chas. I. Welch
F. M. Jones
INVENTOR
Andrew F. Shuler
BY
Shepherd
ATTORNEYS

United States Patent Office.

ANDREW F. SHULER, OF ARCANUM, OHIO.

TOBACCO-PLANTER.

SPECIFICATION forming part of Letters Patent No. 471,624, dated March 29, 1892.

Application filed March 6, 1891. Serial No. 383,885. (No model.)

*To all whom it may concern:*

Be it known that I, ANDREW F. SHULER, a citizen of the United States, residing at Arcanum, in the county of Darke and State of Ohio, have invented certain new and useful Improvements in Tobacco-Planters, of which the following is a specification.

My invention relates to a machine especially adapted for setting out or planting tobacco or similar plants, the constructions and arrangements of the parts being such that the machine is also adapted for planting potatoes or similar vegetables.

My invention consists in the various constructions and combinations of parts hereinafter described, and set forth in the claims.

In the accompanying drawings, Figure 1 is a plan view of a machine embodying my invention. Fig. 2 is a sectional elevation of the same. Fig. 3 is a detail of a fertilizer attachment and dropping mechanism. Fig. 4 is a detail of the cam-disk with the cam projection shown removed. Fig. 5 is a perspective view of the planting and covering devices in detail. Fig. 6 is a rear elevation of the same. Fig. 7 is a sectional view of an attachment for planting potatoes in detail. Figs. 8 and 9 show a modification.

Like parts are indicated by similar letters of reference in the several views.

In the said drawings, A A represents the main frame supported at each side on suitable carrying-wheels B B and provided at the forward end with a tongue C and doubletrees C', to which any suitable motive power is attached to draw the machine forward on the wheels B. The wheels B are each supported on a short axle, to which they are rigidly secured, the axle being in the nature of a divided axle—*i. e.*, formed in two parts B' and B²—supported and adapted to revolve in suitable bearings on the main frame A A.

Secured rigidly on the part B' of the axle, which revolves with one of the carrying-wheels, is a cam-disk B³, which consists, essentially, of a plain disk having a series of holes $a$ arranged in the same near the outer periphery and adapted to receive suitable cam projections $a'$, detachably secured in said holes.

Journaled in a suitable bearing $b$ on the main frame A is a vibrating lever D, pivoted at $b'$ in the bearing $b$ and provided at each end and on opposite sides of said bearing with a series of openings $b^2$ $b^3$. This lever D is projected through the bearing $b$ on one side sufficiently to engage with the cam projections $a'$ in the disk or cam wheel B³, which moves said lever in opposition to a spring D', which as the projections pass said lever return it to its normal position.

Supported below the main frame A A is a planting-shoe E, pivoted at $c$ to a supporting-hanger $c'$, connected near the front of the main frame A A. Connected to the outer ends of the planting-shoe E is a T-shaped supporting-post E', the horizonal bar E² of which is provided at each end with trunnions $d$, which project into and find bearings in guiding-yokes E³, provided with curved slotted openings $d'$ to receive the said trunnions, these slotted openings being formed on the arc of a circle whose center is at the pivotal point $c$ of said planting-shoe. The planting-shoe E is bifurcated at the rear end, forming two angularly-projecting wings E⁵ E⁷. These wings are connected to the bottom of the vertical portion of the T-shaped supporting-post E⁷, the said post being bifurcated at the bottom and extended in projecting prongs $d^2$, riveted or otherwise secured to the wings E⁵ E⁷, as shown in Figs. 5 and 6.

Located in front of the supporting-post E', and connected thereto by suitable U-shaped supporting-clamps $e$ is what I term a "stand-pipe," F, which consists, essentially, of a hollow vertical pipe, the lower end of which is situated within the fork or angle formed by the projecting wings E⁵ E⁷ and slightly above the bottom thereof. This stand-pipe F is provided with a T connection F' and below said T connection with a cut-off valve F², said cut-off valve being provided with a projecting vibrating lever $e'$, adapted by a movement of the same to open or close the valve, any suitable well-known valve adapted to be opened and closed by a movement of said lever being employed, the preferable construction being that known as a "straightway-valve." From the outlet of the T connection leads a rubber tube F³, which connects at the other end to the bottom of a water-box G, supported on the main frame A A. From the side of the T connection opposite to the valve F² is a similar tube or pipe F⁵, which leads to a fertilizer-box H, supported at the rear of and slightly above the water-box G.

Pivoted in a suitable bearing $e^2$ on the stand-pipe F are backwardly-extending fingers $e^3$ $e^5$, preferably formed integral and provided with a projecting operating-lever $e^7$ on the opposite sides of their pivoted bearing $e^2$. This operating-lever $e^7$ is preferably provided with a series of openings $e^{11}$, adapted to receive the end of a connecting-rod $f$, attached at its other end to the vibrating lever D in one of the openings $b^2$. A similar connecting-rod $f'$ forms a connection between said vibrating bar D and the oscillating lever $e'$ of the valve $F^2$, said lever $e'$ being also preferably provided with a series of openings to which said rod $f'$ may be connected, the respective rods $f$ and $f'$ being attached to the vibrating bar D on opposite sides of its pivotal center in the respective openings $b^2$ $b^3$, which openings furnish the means for changing the connecting-point of said rods with said lever, and thus vary the movement of the rods produced by a uniform movement of the lever D. The fingers $e^3$ $e^5$, which I term the "presser-fingers," are preferably formed on their outer extremities in the nature of angular blades, adapted as they are pressed to be forced into the ground slightly and gather or hill up the earth and at the same time press it firmly immediately behind the planting-shoe E.

Pivoted at $g$ to a suitable hanger $g'$, connected to the main frame, is a lifting-lever I, preferably curved upwardly, as shown in Fig. 2, and extended to a convenient point near the top of the box G, so as to be operated by the foot of the driver, a stationary hook $g^2$ on the main frame furnishing the means for engaging the front end of said lever and holding it when pressed forward by the foot of the driver, the said lever being extended at the rear, so as to rest under the horizontal portion $E^2$ of the supporting-post $E'$, means being thus furnished by which the planting-shoe with the stand-pipe and its connections may be elevated within the main frame A A when not in use, the bar $E^2$ being adapted to slide in the slotted openings $d'$.

The fertilizer-box H is provided in the bottom with a suitable opening $h$, a vibrating valve $h'$ being adapted to open and close the same. Connected to the outer extremity of the valve $h'$ is a vibrating or oscillating lever $h^2$, pivoted in a suitable bearing $h^3$ and connected at its lower end by a connecting-rod $f^2$ to the operating-lever D, said rod being adapted to engage in one of the openings $b^2$ in said lever, the oscillating lever $h^2$ being also preferably provided with a series of openings $h^5$ to vary the movement or stroke of said lever by varying the point at which the rod $f^2$ is connected thereto.

At each side of the planting-shoe E, I preferably provide backwardly-extending bars or wings J, preferably connected to said shoe at $k$ by a suitable pin or bolt, which passes through one of a series of openings $k'$. These bars or wings J are further supported by an arch-shaped bar J', connected to the supporting-post E' and pivoted at their lower ends to said wings or bars by suitable bolts or pins $k^2$. These projecting bars or wings are preferably formed in two parts, the rear portion $J^2$ of each part being connected to the forward portion by the small pin or bolt $k^2$, which serves to connect the same to the arch J', the rear portion being further connected to the forward portion by a small pin or bolt $k^3$, which passes through the respective parts in front of the pivotal point $k^2$, one or more openings $k^5$ being provided to receive said pin or bolt $k^3$, means being thus furnished whereby the rear ends of the projecting wings or flanges J may be adjusted so as to change their angular position with reference to the planting-shoe E. These extending bars or wings are preferably curved outward from the front to a point substantially opposite the stand-pipe, from whence they are curved backwardly and inwardly, the lower edge of the front part of said wings or flanges being preferably slightly above the bottom of the planting-shoe, the object and purpose of said wings being to ward off clods of dirt from the shoe E and to draw the loose soil inwardly behind said shoe in the nature of a ridge or hill.

Supported on the main frame A A and extending backwardly therefrom are seat-supporting-beams K, each provided with a seat K', arranged adjacent to the stand-pipe and the presser-fingers.

The operation of the device is as follows: As the machine is drawn forward the wheels B are caused to revolve, which brings the projections $a'$ in the cam or disk wheel $B^3$ in contact with the lever D, causing said lever to be oscillated on its pivotal center $b'$. The movement of this lever is simultaneously transmitted to the valve $F^2$ in the stand-pipe F, the fertilizer-valve $h$, and the presser-fingers $e^3$ $e^5$. The result of this operation permits a certain amount of water from the box G and fertilizer from the box H to be discharged through the stand-pipe F within the shoe E. At the same time the presser-fingers are depressed into the earth and slightly hill up and press the earth at the point where the fertilizer and water are discharged. An operator seated on each of the seats K' drops at the same moment a tobacco or other plant in the trench formed by the shoe E immediately behind the post F', where it is caused to remain and be properly planted by the action of the presser-fingers $e^3$ $e^5$. The wings J, following the presser-fingers, hill up the loose soil about the plants, thus thoroughly protecting the roots of the same.

In planting potatoes or similar vegetables I place a cone-shaped tube or pipe immediately behind the post F' and drop the potatoes through this tube as the lever D is operated in the manner before described. I preferably provide on each of the carrying-wheels a projection or projections L, adapted to make a depression in the soil, as the wheels are revolved, opposite the point at which the planting occurs, there being one of these projections for each projection in the cam or disk wheel B³. It will be understood that the driver sits on the box G and raises and lowers the planting mechanism in turning or otherwise, as desired, the movement of the supporting-bar F' in the curved slotted arms or yokes E³ being adapted to produce a movement of the operating-lever D, which throws it out of contact with the projection a', so that the planting mechanism remains at rest when in an elevated position. By having the supporting-wheels secured rigidly to the axle, as described, and employing a divided axle with the cam-wheel or disk-wheel secured rigidly to one of the parts thereof I am enabled to produce a simple and cheap construction by which all the parts are simultaneously operated by a single operating-lever. The arrangement of the openings a in the disk-wheel permits the projections to be adjusted therein, so as to produce a greater or less number of movements in the lever to a revolution of the supporting-wheel. Taking the point l as a starting-point at which one projection remains permanently the arrangement of the other openings is such that any number of strokes of the lever from one to six may be produced by supplying a suitable number of projections located at the proper subdivisions of the disk formed by said openings, the figures at said openings indicating the location of the projections necessary to produce a number of strokes of the lever to each revolution of the wheel indicated by said number.

It will be understood that the fertilizer discharged into the stand-pipe becomes dissolved by or intimately mixed with the water introduced therein, and that both are discharged through the cut-off valve.

Instead of having the openings a in the revolving disk B³ and the adjustable projections a' to fit in said openings, it may be found preferable to construct the disk B³ as shown in Figs. 8 and 9, the said figures being, respectively, a front and rear view of a modified form of said disk. In this case the disk B³ is made removable and reversible. One side is provided with a certain definite number of permanent projections a², three being shown in Fig. 8. The opposite side of the disk is provided with a different number—say five—as shown in Fig. 9. A number of disks may be provided, each having on opposite sides a different number of permanent projections, so that by reversing the disks a different number of strokes may be given, or by taking off one disk and putting on another any desired number of strokes may be secured at each revolution of the wheel.

It is obvious that the constructions may be modified without departing from the spirit of my invention. I do not therefore limit myself to the exact constructions set forth; but

I claim as my invention—

1. The combination, with a main frame and the supporting-wheels, of a divided axle, one part of which is adapted to turn with one of said wheels, a cam-wheel on said axle, and a pivoted lever to be operated with said cam-wheel, and a stand-pipe having a suitable valve operated by said lever, and presser-fingers supported adjacent to said stand-pipe, and means for connecting said fingers to said operating-lever to cause said fingers to be simultaneously operated with said valve, substantially as specified.

2. In a planter, a stand-pipe having branches leading to a water-receptacle and a fertilizer-receptacle, respectively, a cut-off valve below said branches, presser-fingers adjacent to said stand-pipe, and means, substantially as described, for operating said cut-off valve and said presser-fingers simultaneously, substantially as specified.

3. The combination, with a stand-pipe and the presser-fingers arranged adjacent thereto, a fertilizer-receptacle and a water-receptacle connected by separate tubes or pipes to said stand-pipe, a valve below said fertilizer-receptacle, and a cut-off valve in said stand-pipe below the respective branches to said water and fertilizer receptacles, of means for simultaneously operating the cut-off valve, the fertilizer-valve, and the presser-fingers, substantially as specified.

4. The combination, with a central pivoted operating-lever, a cam-wheel having projections adapted to engage said lever to vibrate the same, and a spring to return said lever to its normal position, of a stand-pipe having a cut-off valve located therein, pivoted presser-fingers arranged at each side of said stand-pipe and adapted to project rearwardly therefrom, and independent adjustable connecting-rods extending, respectively, from the cut-off valve and the said presser-fingers to opposite sides of the pivotal center of said lever, whereby a simultaneous action is produced of said valve and fingers by a movement of said lever, substantially as specified.

5. The combination, with a pivoted lever having a series of openings on each side of its pivoted center, a cam-wheel having projections adapted to engage said lever, and a spring for returning said lever to its normal position, of a stand-pipe having a cut-off valve and presser-fingers pivoted adjacent to said stand-pipe, connecting-rods from said presser-fingers and from said cut-off valve, and means for connecting said rods in openings in said lever at each side of the pivoted center thereof, substantially as specified.

6. The combination of a main frame and a planting-shoe pivoted thereto, a T-shaped supporting-post having projecting ends operating in slotted yokes on said frame, means for raising and lowering said shoe in said slotted yokes, a cut-off valve in said stand-pipe, and an oscillating lever adapted to be operated by the revolution of the supporting-wheels to move said valve, and means, substantially as described, for throwing said lever out of engagement with the operating mechanism when the planting-shoe is raised, substantially as specified.

7. In a planter, the combination, with a planting-shoe, a T-shaped supporting-post, slotted guiding-yokes, and a lifting-lever for said T-shaped post, of a stand-pipe connected to said shoe, a cut-off valve in said stand-pipe, movable presser-fingers connected to said post, and an oscillating operating-lever connected on opposite sides of its pivoted center to said presser-fingers and to said cut-off valve, respectively, and means for intermittently oscillating said lever to produce a simultaneous movement of said valve and fingers, substantially as and for the purpose specified.

8. The combination of a planting-shoe, a T-shaped supporting-post connected thereto, the curved slotted guiding-yokes, a stand-pipe connected to said supporting-post, branches from said stand-pipe leading, respectively, from a water-receptacle and a fertilizer-receptacle, a cut-off valve below said branch connections, presser-fingers pivoted adjacent to said stand-pipe, a pivoted lever connected at one side of its pivoted center to said presser-fingers and at the other to said cut-off valve, and a fertilizer-controlling valve adapted to be operated by said lever, and means for intermittently moving said lever by the revolution of the carrying-wheels, substantially as specified.

9. The combination, with a main frame and the carrying-wheels, of a divided axle, one part of which is connected rigidly to one of the said carrying-wheels and provided with a disk or cam wheel secured thereto, a series of openings in said cam-wheel, adapted to receive adjustable cam projections, a pivoted lever on the main frame, adapted to engage with said projections, a stand-pipe and cut-off valve therein, presser-fingers adjacent to said stand-pipe, and means for connecting said presser-fingers and said cut-off valve to said oscillating lever on opposite sides of the center thereof, substantially as specified.

In testimony whereof I have hereunto set my hand this 23d day of February, A. D. 1891.

ANDREW F. SHULER.

Witnesses:
JOHN HOPACKER,
H. A. KEYMER.